United States Patent
Zhang et al.

(10) Patent No.: US 11,604,774 B2
(45) Date of Patent: Mar. 14, 2023

(54) METHOD AND APPARATUS OF CONVERTING SCHEMA IN DEEP LEARNING FRAMEWORK, AND COMPUTER STORAGE MEDIUM

(71) Applicant: Beijing Baidu Netcom Science Technology Co., Ltd., Beijing (CN)

(72) Inventors: Liujie Zhang, Beijing (CN); Yamei Li, Beijing (CN); Huihuang Zheng, Beijing (CN); Hongyu Liu, Beijing (CN); Xiang Lan, Beijing (CN); Dianhai Yu, Beijing (CN); Yanjun Ma, Beijing (CN); Tian Wu, Beijing (CN); Haifeng Wang, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/480,294

(22) Filed: Sep. 21, 2021

(65) Prior Publication Data
US 2022/0004526 A1    Jan. 6, 2022

(30) Foreign Application Priority Data
Nov. 9, 2020    (CN) .......................... 202011242902.8

(51) Int. Cl.
*G06F 16/00* (2019.01)
*G06F 16/21* (2019.01)
*G06F 16/22* (2019.01)

(52) U.S. Cl.
CPC ........ *G06F 16/211* (2019.01); *G06F 16/2246* (2019.01)

(58) Field of Classification Search
CPC .......................... G06F 16/211; G06F 16/2246
See application file for complete search history.

(56) References Cited

U.S. PATENT DOCUMENTS

2012/0084749 A1    4/2012   Gogh et al.
2016/0299748 A1    10/2016  Scholz et al.
(Continued)

FOREIGN PATENT DOCUMENTS

CN    102385513 A    3/2012
CN    109657103 A    4/2019
(Continued)

OTHER PUBLICATIONS

Looks et al., Deep Learning With Dynamic Computation Graphs, arxiv.org, Cornell University Library, Feb. 7, 2017, pp. 1-12 (Year: 2017).*
(Continued)

*Primary Examiner* — Tyler J Torgrimson
(74) *Attorney, Agent, or Firm* — Keating & Bennett, LLP (57) ABSTRACT

A method and apparatus of converting a schema in a deep learning framework, an electronic device, and a computer storage medium are provided. The method of converting the schema in the deep learning framework includes: updating a first schema, based on first syntax elements in the first schema and a context relationship between the first syntax elements in the first schema, so as to obtain an updated first schema; generating second syntax elements corresponding to updated first syntax elements in the updated first schema, based on a mapping relationship between the updated first syntax elements in the updated first schema and second syntax elements in a second schema system; and combining the second syntax elements according to a context relationship between the updated first syntax elements, so as to generate a second schema.

9 Claims, 5 Drawing Sheets

(56) References Cited

U.S. PATENT DOCUMENTS

| | | |
|---|---|---|
| 2017/0039138 A1 | 2/2017 | Toda |
| 2019/0034780 A1 | 1/2019 | Marin et al. |

FOREIGN PATENT DOCUMENTS

| | | |
|---|---|---|
| CN | 110543297 A | 12/2019 |
| CN | 111625224 A | 9/2020 |
| CN | 111708539 A | 9/2020 |
| CN | 111831384 A | 10/2020 |
| JP | 2007-158687 A | 6/2007 |
| JP | 2017-033446 A | 2/2017 |

OTHER PUBLICATIONS

Official Communication issued in corresponding European Patent Application No. 21197920.8, dated Mar. 17, 2022.

Looks et al., "Deep Learning With Dynamic Computation Graphs", arxiv.org, Cornell University Library, Feb. 7, 2017, pp. 1-12.

Raschka et al., "Machine Learning in Python: Main developments and technology trends in data science, machine learning, and artificial intelligence", arxiv.org, Cornell University Library, Feb. 12, 2020, pp. 1-48.

Official Communication issued in corresponding Japanese Patent Application No. 2021-143795, dated Aug. 30, 2022.

Tokui, "Frontiers of Neural Network Research", Artificial Intelligence vol. 31, No. 2 , The Japanese Society for Artificial Intelligence JSAI, Mar. 1, 2016, pp. 216-222.

Otsu, "Python to Learn", First edition, Impress Corporation, Aug. 20, 2020, 7 pages including pp. 150-152.

Hishinuma, "11th, If Statement for Conditional Branches With Elif•Break•Pass•Continue (Yuka Hishinuma)", https://www.school.ctc-g.co.jp/columns/hishinuma/hishinuma11.html, Aug. 31, 2020, 6 pages.

Note.nkmk.me, "Loop Processing by While Statement of Python (Infinite Loop, Etc.)", https://note.nkmk.me/python-while-usage/, Feb. 2, 2019, 8 pages.

Matsuoka, "Learning Language Processing Programming From Principles", Interface vol. 15 No. 3 CQ Publishing Co.,Ltd., Mar. 1, 1989, pp. 196-210.

Official Communication issued in corresponding Chinese Patent Application No. 202011242902.8, dated Jul. 14, 2021.

\* cited by examiner

METHOD AND APPARATUS OF CONVERTING SCHEMA IN DEEP LEARNING FRAMEWORK, AND COMPUTER STORAGE MEDIUM

CROSS REFERENCE TO RELATED APPLICATION(S)

This application claims the priority of the Chinese patent application 202011242902.8 filed on Nov. 9, 2020, the entire content of which is incorporated herein in its entirety by reference.

TECHNICAL FIELD

Embodiments of the present disclosure relate to a field of machine learning, and in particular to a method and apparatus of converting a schema, a non-transitory computer storage medium, and a computer program product.

BACKGROUND

Current deep learning frameworks try to solve both problem of usability and performance deployment. At present, a mainstream deep learning framework generally has two schemas, including an imperative programming schema (also known as a dynamic graph schema) and a declarative programming schema (also known as a static graph schema). In the imperative programming schema, after a computing statement is executed, the execution is immediately interpreted, and a computation result is immediately available. Such a mechanism is more in line with user programming habits and easier to perform schema debugging. It is easy for a user to write, but a machine execution consumes a lot of computing resources. In the declarative programming schema, when a program is compiled and executed, a graph structure of computation is firstly built, and then an operation of the graph structure is executed by using an execution unit. Such a mechanism is not easy for the user to write, but the machine execution consumes less computing resources, so that this mechanism is suitable for industrial schemal deployment.

SUMMARY

Therefore, it is necessary to provide a scheme of a schema conversion, so that the schema conversion may be performed between the imperative programming schema (also known as the dynamic graph schema) and the declarative programming schema (also known as the static graph schema).

According to embodiments of the present disclosure, there is provided the scheme of the schema conversion.

In a first aspect of the present disclosure, there is provided a method of converting a schema, including: updating a first schema, based on first syntax elements in the first schema and a context relationship between the first syntax elements in the first schema, so as to obtain an updated first schema; generating second syntax elements corresponding to updated first syntax elements in the updated first schema, based on a mapping relationship between the updated first syntax elements in the updated first schema and second syntax elements in a second schema system; and combining the second syntax elements according to a context relationship between the updated first syntax elements, so as to generate a second schema.

In a second aspect of the present disclosure, there is provided an apparatus of converting a schema, including: a first update module configured to update a first schema, based on first syntax elements in the first schema and a context relationship between the first syntax elements in the first schema, so as to obtain an updated first schema; a syntax element conversion module configured to generate second syntax elements corresponding to updated first syntax elements in the updated first schema, based on a mapping relationship between the updated first syntax elements in the updated first schema and second syntax elements in a second schema system; and a schema generation module configured to combine the second syntax elements according to a context relationship between the updated first syntax elements, so as to generate a second schema.

In a third aspect of the present disclosure, there is provided an electronic device, including: one or more processors; and a storage device for storing one or more programs, wherein the one or more programs, when executed by the one or more processors, cause the one or more processors to implement the method according to the first aspect of the present disclosure.

In a fourth aspect of the present disclosure, there is provided a non-transitory computer-readable storage medium having computer programs stored thereon, wherein the computer programs, when executed by a processor, cause the processor to implement the method according to the first aspect of the present disclosure.

In a fifth aspect of the present disclosure, there is provided a computer program product containing computer program instructions, wherein the computer program instructions are executable by a processor to implement the method according to the first aspect of the present disclosure.

It should be understood that content described in this section is not intended to limit key or important features in the embodiments of the present disclosure, nor is it intended to limit the scope of the present disclosure. Other features of the present disclosure will be easily understood through the following description.

BRIEF DESCRIPTION OF THE DRAWINGS

The above and other features, advantages and aspects of the embodiments of the present disclosure will become more apparent in combination with the drawings and with reference to the following detailed description. In the drawings, same or similar reference numerals indicate same or similar elements.

DETAILED DESCRIPTION OF EMBODIMENTS

Preferable embodiments of the present disclosure will be described below in more detail with reference to the drawings. Although the preferable embodiments of the present disclosure are shown in the drawings, it should be understood that the present disclosure may be implemented in various forms and should not be limited by the embodiments described herein. On the contrary, these embodiments are provided to enable a more thorough and complete understanding of the present disclosure and to fully convey the scope of the present disclosure to those skilled in the art.

The term "including" and its variants as used herein means open-ended inclusion, that is, "including but not limited to." Unless otherwise specified, the term "or" means "and/or." The term "based on" means "at least partially based on." The terms "an exemplary embodiment" and "an embodiment" mean "at least one exemplary embodiment." The term "another embodiment" means "at least one other embodiment." The terms "first," "second," and the like may refer to different or the same objects. The following may also include other explicit and implicit definitions.

As mentioned above, it is necessary to provide a scheme of performing a schema conversion between the imperative programming schema (also known as the dynamic graph schema) and the declarative programming schema (also known as the static graph schema), so as to achieve a deep learning framework with both usability and deployment. In a related art, a dynamic graph to static graph (hereinafter referred to as dynamic to static) module is developed so that a user of a framework system may use the dynamic graph schema to construct the deep learning framework conveniently, and use the static graph schema to obtain an advantage of deployment performance. Specifically, it converts the dynamic graph schema into the static graph schema or into an intermediate representation IR of the static graph. Both conversions mentioned above need compiler-related technologies, and implementation steps thereof include firstly parsing a front-end code of the dynamic graph schema into an abstract syntax tree (AST), and then generating the static graph schema or the intermediate representation IR of the static graph from the abstract syntax tree. Following defects mainly exist in the related art.

1) The related art lacks an optimization for a high-level language in a dynamic to static process. Some statements in the dynamic graph schema are redundant or a loop nesting is complicated, and a direct conversion into the static graph without optimization may lead to a consumption of a lot of computing resources in an operation of the static graph.

(2) In software engineering, a schema consistency or an operation consistency between the dynamic graph and the static graph is highly restricted. The less the schema difference between the dynamic graph and the static graph, the less the conversion amount. In this case, some deep learning frameworks need to define consistent operation interfaces for the static graph and the dynamic graph, so that a schema before conversion and a schema after conversion may operate in the same way in the dynamic graph and the static graph. In terms of defining the same interface for the dynamic graph schema and the static graph schema, the deep learning framework is highly required.

According to the embodiments of the present disclosure, a scheme of performing a schema conversion is proposed. In this scheme, an optimization is performed in the process of schema conversion. In this scheme, a first schema is updated firstly. Then, syntax elements of an updated schema are converted into syntax elements of a second schema through a mapping relationship. Finally, second syntax elements are combined based on a context relationship so as to generate the second schema.

By adding the optimization process into the process of schema conversion, an execution speed for the schema after conversion may be improved. By establishing different optimization and mapping models, it is convenient to perform schema debugging.

Basic principles and some exemplary implementations of the present disclosure are illustrated below with reference to the drawings.

Figure 1:
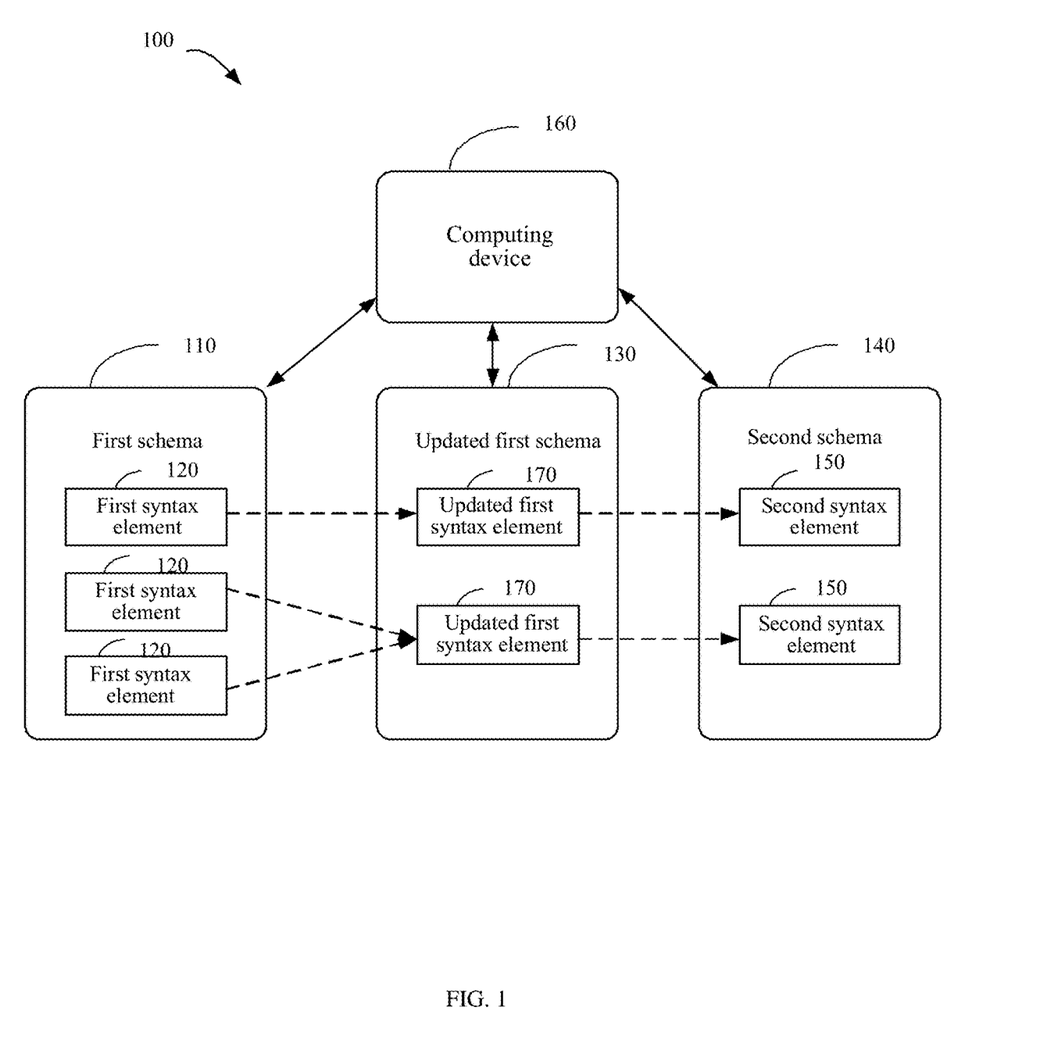
FIG. 1 shows a schematic diagram of an exemplary environment in which various embodiments of the present disclosure may be implemented.

FIG. 1 shows a schematic diagram of an exemplary environment 100 in which various embodiments of the present disclosure may be implemented. It should be understood that the environment 100 shown in FIG. 1 is merely exemplary and should not constitute any limitation on functions and scopes of implementations described in the present disclosure. As shown in FIG. 1, the environment 100 includes a first schema 110, first syntax elements 120, updated first syntax elements 170, an updated first schema 130, a second schema 140, second syntax elements 150, and a computing device 160.

The first schema 110 may be a dynamic graph schema. In the embodiments of the present disclosure, for the convenience of description and understanding, the term "schema" will be represented in the form of code, which may build a network with the help of PYTHON's native syntax elements (for, if, else, while). The first schema 110 is implemented through imperative programming, and it is not easy to be executed by a machine. That is, a machine overhead cost required for an execution of the first schema 110 is large. For example, it needs many graphics processing unit (GPU) resources or takes a lot of time.

The computing device 160 may parse the first schema 110. For example, the computing device 160 may parse the first syntax elements 120 in the first schema 110 and a context relationship between the first syntax elements 120 by using a parser. The first syntax element 120 herein may refer to a basic component unit of the schema. In the embodiments of the present disclosure, the syntax element refers to a basic component element in various schema languages. For example, if a source schema file of an application is PYTHON language, the syntax elements in the schema may specifically refer to a control process (for, if, else, while), an input and an output (input, print), a program format, a data type and variables, etc. In a case of JAVA language, the syntax elements refer to a class, an attribute, a schema block, an annotation, a comment, etc. The computing device may update (optimize) the first schema and convert the first schema into a second schema 140, based on a result of parsing the first schema 110. A specific process will be described below. The PYTHON language is merely exemplary, and the first schema 110 may also be created based on any language system suitable to be written by the user.

The computing device 160 may be any device with computing power. As an unlimited example, the computing device 160 may be any type of a fixed computing device, a mobile computing device or a portable computing device, including but not limited to a desktop computer, a laptop computer, a notebook computer, a netbook computer, a tablet computer, a multimedia computer, a mobile phone, etc. All or a part of components of the computing device 160 may be distributed in a cloud. The computing device 160 at least includes a processor, a memory, and other components generally present in a general-purpose computer, so as to implement functions such as computation, storage, communication, control, etc.

In an embodiment, the computing device 160 may include pre-trained syntax parser, syntax optimizer, syntax converter, schema generator, and the like.

The updated first schema 130 and the first schema 110 are schemas in the same language system. A number of the updated first syntax elements 170 in the updated first schema 130 is less than that of the first syntax elements 120 in the first schema 110. An update (optimization) process will be described below in detail.

The second schema 140 may be a static graph schema, which does not output a result at each step when it is executed, but finally outputs a result entirely. The machine overhead cost required for the execution of the second schema 140 is less than that required for the execution of the first schema 110. The second schema 140 may be C++ or an intermediate representation schema, which is not limited in the present disclosure. It may be any schema language suitable for machine execution. The second schema 140 may include second syntax elements 150.

Figure 2:
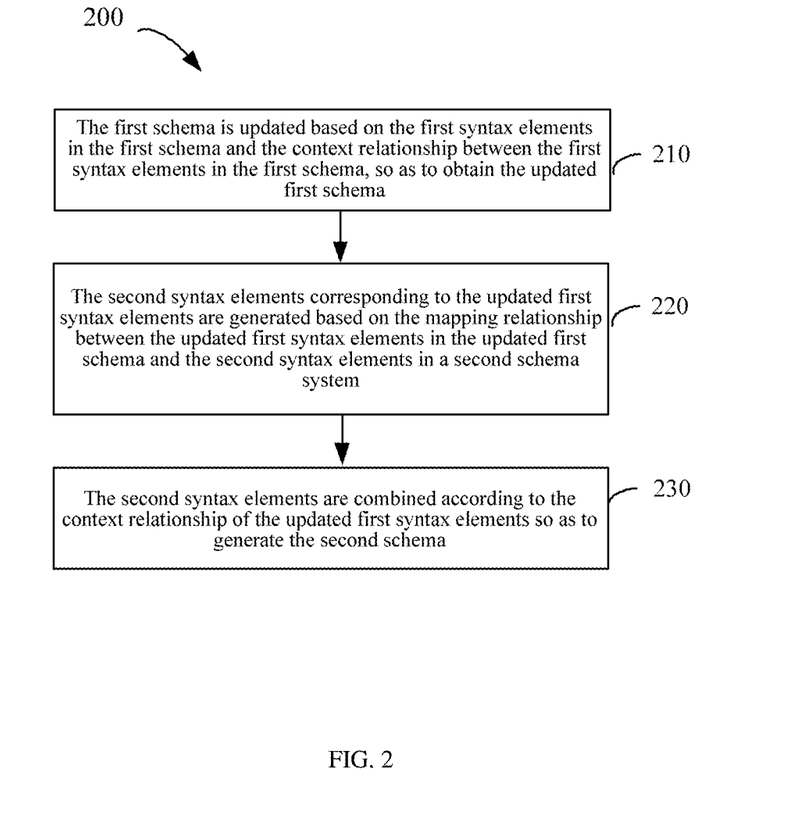
FIG. 2 shows a flowchart of a process of converting a schema according to some embodiments of the present disclosure.
Figure 3:
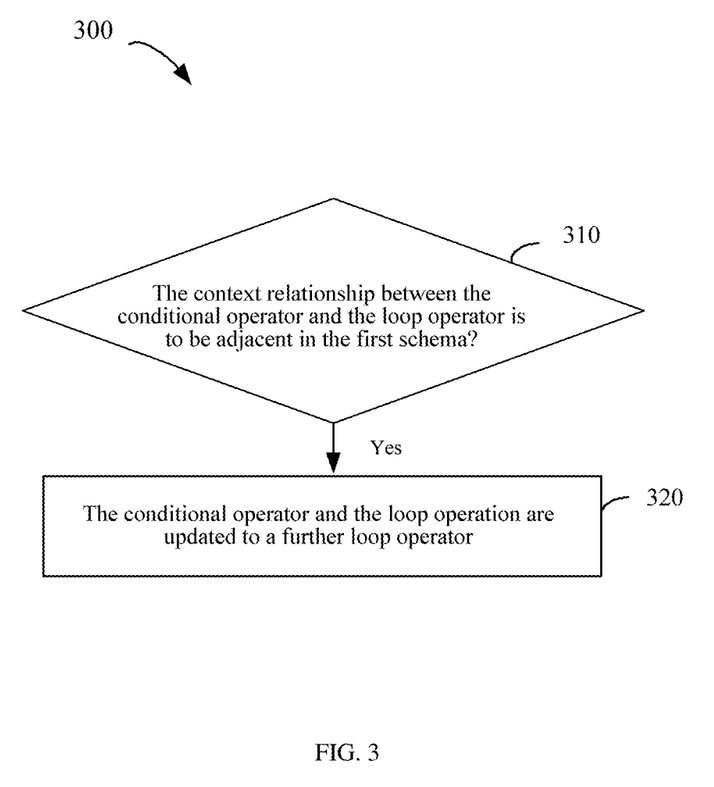
FIG. 3 shows a flowchart of a process of updating a schema according to some embodiments of the present disclosure.

A detailed process of the schema conversion is further described below in combination with FIG. 2 to FIG. 4. FIG. 2 shows a flowchart of a method 200 of converting a schema according to some embodiments of the present disclosure. The method 200 may be implemented by the computing device 160 in FIG. 1. For ease of description, the method 200 will be described with reference to FIG. 1.

In block 210, the computing device 160 updates the first schema 110 based on the first syntax elements 120 in the first schema 110 and the context relationship between the first syntax elements 120 in the first schema, so as to obtain the updated first schema 130.

In an embodiment, a number of the updated first syntax elements 170 in the updated first schema 130 is less than that of the first syntax elements 120 in the first schema 110.

For example, the computing device 160 may perform syntax parsing on the first schema, and convert the first schema into an abstract syntax tree (AST) of the first schema at an abstract syntax tree level. The computing device 160 may parse the first schema 110 formed by the first syntax elements 120 according to a certain given formal grammar and determine a syntax structure thereof, that is, the first syntax elements 120 and the context relationship between the first syntax elements 120.

In an embodiment, the computing device 160 may perform the syntax parsing on the first schema 110 by using an internal or external syntax parser. The syntax parser is generally used as a component of a compiler or an interpreter, and functions to check syntax and construct a data structure formed by input words (generally a hierarchical data structure such as a syntax parse tree, an abstract syntax tree, etc.). The syntax parser generally separates words from an input character stream by using an independent lexical analyzer, and takes a word stream as its input. In an actual development, the syntax parser may be written manually or (semi)automatically generated by a tool.

The abstract syntax tree is an abstract representation of a source schema syntax structure. It represents a structure of programming language in the form of a tree, and each node ASTNode of the tree represents a structure in the source schema. The abstract syntax tree defines each type of syntax element in the first schema 110 as a corresponding object, and each node of the tree represents a structure present in the source schema. Syntax is abstract because it does not represent each detail present in real syntax but only represents details about the structure and content. For example, grouping brackets are implicit in the tree structure, and a syntactic structure similar to an if-condition-then expression may be represented by a single node with three branches. It is generally built by the parser during the source application schema conversion and compilation. Once the syntax is built, additional information is added to the AST through subsequent processing (for example, context parsing).

Next, the computing device 160 may update the first schema 110 according to the first syntax elements 120 and the context relationship acquired above. The update process will be further described in combination with FIG. 3. FIG. 3 shows a flowchart of a process of updating a schema according to some embodiments of the present disclosure.

In block 310, the computing device 160 determines whether a context relationship between a loop operator and a conditional operator included in the first syntax elements 110 is to be adjacent in the first schema or not. For example, in a case of PYTHON, the first schema 110 contains:
while i<n:
  if some_condition:
    break The computing device 160 may parse a presence of the first syntax elements 120, including a loop operator while and a conditional operator if, and the computing device 160 may determine that they are adjacent in the first schema 110.

In block 320, the computing device 160 updates the conditional operator and the loop operator to a further loop operator. For example, continuing to describe the above example, the computing device 160 updates the above schema to an equivalent PYTHON schema:
while i<n and some_condition:
in which only one loop operator while exists. That is, the second schema 140 converted based on the updated first schema 130 contains only one loop operator, so that a subsequent execution may be several times (for example, at least 7 times) faster than the execution prior to the optimization.

In an alternative embodiment, in a case that the first syntax elements 120 include constants, the computing device 160 may remove repetitive constants in the first schema 110. For example, if the first schema contains a=1, b=a, c=b, then the computing device 160 may update (optimize) it to a=b=c=1.

The above examples are only illustrative. In addition, there may be various updates and optimizations for the first schema, such as constant optimization, redundant sentence removal optimization, equivalent but faster schema replacement optimization, etc., so that the number of the updated first syntax elements 170 in the updated first schema 130 is less than that of the first syntax elements 120 in the first schema 110. Each update or optimization may also be limited to a conversion function or module, and various functions or modules may be added and deleted later, and a test optimization is also very flexible. Analyzing and optimizing in a hierarchical level of the first schema (that is, the dynamic graph schema) may significantly improve the execution speed of the static graph after conversion.

Referring back to FIG. 2, in block 220, the computing device 160 may generate second syntax elements 150 corresponding to the updated first syntax elements 170, based on the mapping relationship between the updated first syntax elements 170 in the updated first schema 130 and the second syntax elements 150 in a second schema system.

In an example, the computing device 160 may create different converter categories between the updated first syntax elements 170 and the corresponding second syntax elements 150, such as an IfElse converter for converting a syntax element If-else, a Loop converter for converting a loop, a Print converter for converting a standard output, and so on.

In an embodiment, the abstract syntax tree of each updated first syntax element 170 in the updated first schema 130 is used as an input of a converter, and the converter converts and outputs a new abstract syntax tree as the second syntax element 150. After the conversion of the updated first syntax elements 170 and the second syntax elements 150 with syntax differences therebetween is completed, the updated first syntax elements 170 in the updated first schema 130 are converted to the second syntax elements 150. An advantage of such a structure resides in that a plurality of syntax element converters may be debugged separately in software engineering, optimization may be performed for different types of syntax element converters, and the syntax elements may also be tested separately during testing.

In block 230, the computing device 160 combines the second syntax elements 150 according to the context relationship of the updated first syntax elements 170 so as to generate the second schema 140. For example, the computing device may combine converted parameters and calling functions according to a logical relationship between the parameters and the calling functions in the updated first schema 130 so as to generate the second schema 140.

In an embodiment, the first syntax elements 120 include a first operator, and the second syntax elements 150 include a second operator. The computing device 160 allows the second schema 140 to be executed through the first operator corresponding to the second operator.

For example, the computing device 160 may execute the second schema 140 through the first operator of the first schema 110. The first operator contains an operation converted into the second schema 140. The first operator may perform a forward computation and a backward computation of a neural network. In an example, the first schema may be
def op_add(x,y);
   return x+y
where the first operator is a sum operator add. The computing device 160 may convert the first schema to the second schema "add, x, y of the second schema," which contains the second operator written in a second schema language (the sum operator add written in the second schema language). Then, the computing device 160 may continue to execute the second schema through the operator add of the first schema corresponding to the second operator, that is,
def op_add (add, x, y of the second schema);
   sum=execute the second schema_add (x,y);
   return sum
A result sum of the operation is finally obtained.

The above shows an example that the first operator and the second operator are single operators, that is, the sum operator add. In another example, the first operator may be a combinatorial operator, for example, the first schema may be:
def func(x):
   return softmax (w*x+b)
That is, the first operator of the first schema is matrix multiplication w*x, plus an offset+b, and finally perform softmax processing. Then, the computing device 160 may convert the first schema to the second schema "func (x) of the second schema", which contains the second operator written in the second schema language (softmax (w*x+b) operation written in the second schema language). The computing device 160 may then continue to execute the second schema through the operator of the first schema, that is,
def func (func (x) of the second schema):
   return execute func (x) of the second schema.

By fully nesting the converted second schema into a part of the first schema for execution, the need for uniform interfaces between different schemas may be reduced. In a deep learning framework in which the first schema (the dynamic graph schema) and the second schema (the static graph schema) run in very different ways, after the dynamic graph schema is converted to the static graph schema, the static graph schema may fail to run on a basis of the original dynamic graph schema due to the different running ways. The above method relaxes this part of software management burden, so that even if the operating ways are different, the static graph schema may still run in the dynamic graph schema by encapsulating as a dynamic graph operator. In addition, it is possible to partially convert the dynamic graph schema to the static graph schema, for example, in a case that the user is only dissatisfied with the performance of a small part of the dynamic graph schema but intends to save the other part of the dynamic graph schema. The above method is more flexible than the method of converting then entire dynamic graph schema into the static graph schema.

The present disclosure takes into account both the usability and the deployment performance of the deep learning framework. By updating and optimizing the imperative programming (also known as dynamic graph) schema prior to the conversion, an execution efficiency of the declarative programming (also known as static graph) schema after the conversion may be improved. By running the converted static graph schema as a dynamic graph operator, it is not necessary to limit the same interface, so that an inclusiveness of the deep learning framework may be improved. In addition, by defining different types of syntax element converters and optimization converters, the schema conversion may be flexibly divided and tested, and the converters may be added and deleted conveniently, so that the system is flexible and expandable.

Figure 4:
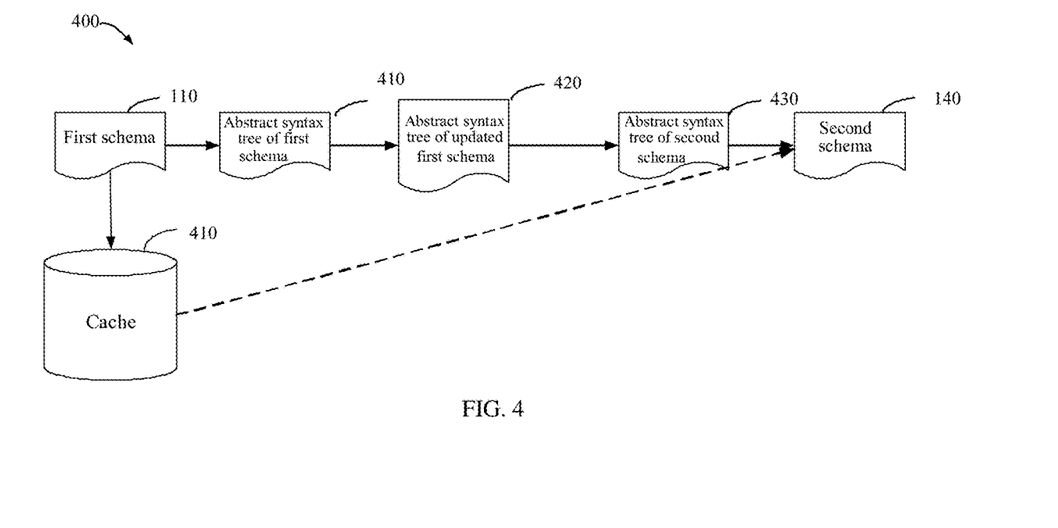
FIG. 4 shows a flowchart of an exemplary process of converting a schema according to some embodiments of the present disclosure.

FIG. 4 shows a flowchart of an exemplary process of converting a schema according to some embodiments of the present disclosure. Firstly, the computing device 160 determines whether to perform the conversion on the first schema 110. For the first schema specified by the user, an application programming interface of the first schema in deep learning often requires multiple cycles to run multiple times for big data training. If the schema conversion is performed for each run, the system may slow down. In order to accelerate the conversion process, the system may firstly determine whether a part of the schema has been converted previously by using a high-speed memory (such as cache). If the cache hits, that is, it is determined that this part of the schema has been converted previously, the process may directly return to the converted static graph schema. Otherwise, a formal conversion process starts, and a result of this conversion is stored in the cache.

In an embodiment, the computing device acquires the first identifier of the first schema, and determines the second identifier of a further first schema. If it is determined that the first identifier matches the second identifier, the second schema is determined as a schema corresponding to the further first schema in the second schema system.

For example, the computing device 160 may store the first identifier of the first schema and the identifier of the converted second schema corresponding to the first identifier in a cache 410 as an identifier pair. When the computing device 160 receives the further first schema, the second identifier of the further schema is firstly acquired. The computing device 160 may then compare the second identifier with the first identifier in the identifier pair. If the first identifier matches the second identifier, it means that the further first schema is the same as or functionally equivalent to the first schema. Then the computing device may determine the historically converted second schema through the identifier of the second schema in the identifier pair, and directly take the second schema as a schema converted from the further first schema.

If the computing device 160 determines that the first identifier does not match the second identifier, the computing device may parse the first schema 110 into an abstract syntax tree 410 of the first schema. The abstract syntax tree is then updated or optimized to determine an abstract syntax tree 420 of the updated first schema. The computing device 160 may then determine an abstract syntax tree 430 of the second schema. Finally, the computing device 160 generates the second schema 140. For the detailed process, reference may be made to the above description of FIG. 2, which will not be repeated here.

It should be noted that although the above update or optimization process is shown as an operation on the first schema, the second schema may also be optimized or updated, or the first schema and the second schema may be updated and optimized simultaneously, which is not limited in the present disclosure.

Figure 5:
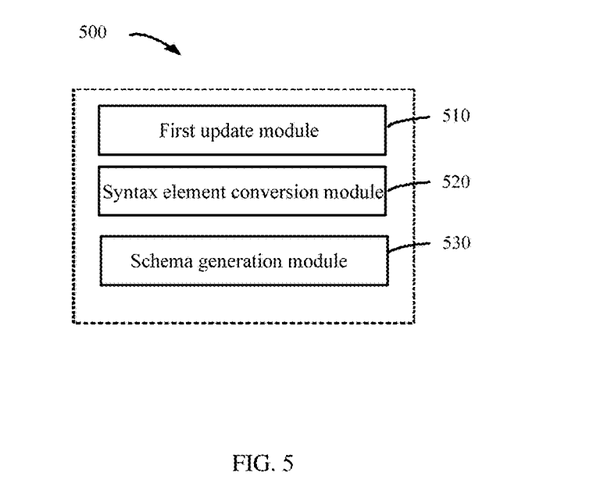
FIG. 5 shows a schematic block diagram of an apparatus of converting a schema according to some embodiments of the present disclosure.

FIG. 5 shows a schematic block diagram of an apparatus of converting a schema in a deep learning framework according to some embodiments of the present disclosure. An apparatus 500 may be included in or implemented as the computing device 160 of FIG. 1.

As shown in FIG. 5, the apparatus 500 includes a first update module 510 configured to update a first schema, based on first syntax elements in the first schema and a context relationship between the first syntax elements in the first schema, so as to obtain an updated first schema; a syntax element conversion module 520 configured to generate second syntax elements corresponding to updated first syntax elements in the updated first schema, based on a mapping relationship between the updated first syntax elements in the update first schema and second syntax elements in a second schema system; and a schema generation module 530 configured to combine the second syntax elements according to a context relationship between the updated first syntax elements, so as to generate a second schema.

In some embodiments, the number of the updated first syntax elements is less than that of the first syntax elements.

In some embodiment, the first syntax elements may include a first operator, and the second syntax elements may include a second operator. The apparatus 500 may further include a schema execution module configured to allow the second schema to be executed through the first operator corresponding to the second operator.

In some embodiments, the first identifier of the first schema is stored in a high-speed storage device. The apparatus 500 may further include: a first identifier determination module configured to acquire the first identifier of the first schema; a second identifier determination module configured to determine a second identifier of a further first schema; and a schema determination module configured to determine the second schema as a schema corresponding to the further first schema in the second schema system, in response to determining that the first identifier matches the second identifier.

In some embodiments, the first syntax elements may include a loop operator and a conditional operator. The first update module 510 may include a second update module configured to update the conditional operator and the loop operator as a further loop operator, in response to determining that a context relationship between the conditional operator and the loop operator is to be adjacent in the first schema.

In some embodiments, the first syntax elements include constants. Based on the first syntax elements in the first schema and the context relationship between the first syntax elements in the first schema, the first update module may include a third update module configured to remove repetitive constants in the first schema.

In some embodiments, the first schema may be implemented through the imperative programming, and the second schema may be implemented through declarative programming.

In some embodiments, the machine overhead cost required for the execution of the first schema may be greater than that required for the execution of the second schema.

Figure 6:
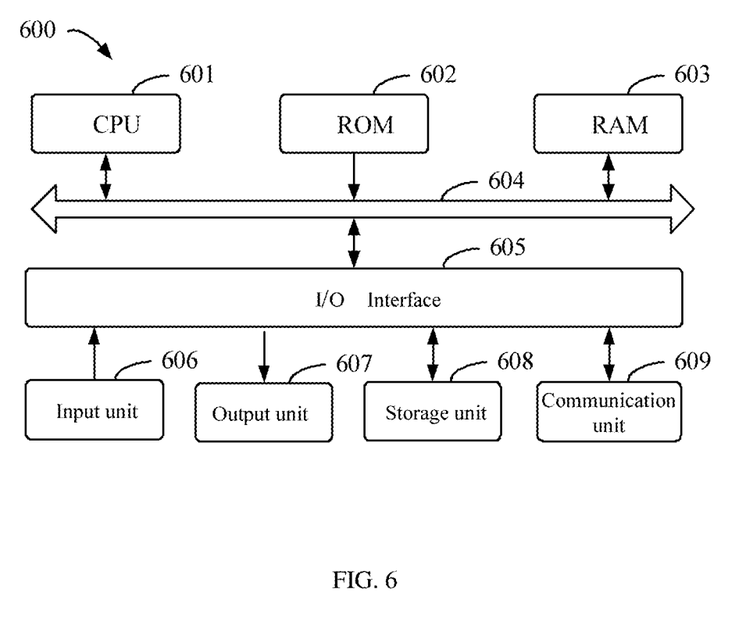
FIG. 6 shows a block diagram of a computing device for implementing the various embodiments of the present disclosure.

FIG. 6 shows a schematic block diagram of an exemplary device 600 for implementing the embodiments of the present disclosure. For example, the computing device 160 in the exemplary environment 100 shown in FIG. 1 may be implemented by the device 600. As shown, the device 600 includes a center processing unit (CPU) 601 that may perform various appropriate actions and processing based on computer program instructions stored in a read-only memory (ROM) 602 or computer program instructions loaded from a storage unit 608 into a random access memory (RAM) 603. Various programs and data required for the operation of the device 600 may be stored in the RAM 603. The CPU 601, the ROM 602 and the RAM 603 are connected to each other through a bus 604. An input/output (I/O) interface 605 is also connected to the bus 604.

A plurality of components in the device 600, including an input unit 606 such as a keyboard, a mouse, etc., an output unit 607 such as various types of displays, speakers, etc., a storage unit 608 such as a magnetic disk, an optical disk, etc., and a communication unit 609 such as a network card, a modem, a wireless communication transceiver, etc., are connected to the I/O interface 605. The communication unit 609 allows the device 600 to exchange information/data with other devices through a computer network such as the Internet and/or various telecommunication networks.

Various processes and processing described above, such as the method 200 and the method 300, may be performed by the processing unit 601. For example, in some embodiments, the method 200 and the method 300 may be implemented as a computer software program that is tangibly contained in a machine-readable medium, such as a storage unit 608. In some embodiments, part or all of computer programs may be loaded and/or installed on the device 600 via the ROM 602 and/or the communication unit 609. When the computer programs are loaded into the RAM 603 and executed by the CPU 601, one or more actions in the method 200 and the method 300 described above may be executed.

The present disclosure may be a method, an apparatus, a system and/or a computer program product. The computer program product may include a non-transitory computer-readable storage medium loaded with computer-readable program instructions for executing various aspects of the present disclosure.

The non-transitory computer-readable storage medium may be a tangible device that may hold and store instructions used by an instruction execution device. The non-transitory computer-readable storage medium may be, for example, but not limited to, an electrical storage device, a magnetic storage device, an optical storage device, an electromagnetic storage device, a semiconductor storage device, or any suitable combination thereof. More specific examples (non-exhaustive list) of the non-transitory computer-readable storage medium include a portable computer disk, a hard disk, a random access memory (RAM), a read-only memory (ROM), an erasable programmable read-only memory (EPROM or flash memory), a static random access memory (SRAM), a portable compact disk read-only memory (CD-ROM), a digital versatile disk (DVD), a memory stick, a floppy disk, a mechanical encoding device, a punched card or a protruding structure in a groove with instructions stored thereon, and any suitable combination thereof. The non-transitory computer-readable storage medium used here is not interpreted as a transient signal itself, such as radio waves or other freely propagating electromagnetic waves, electromagnetic waves propagating through waveguides or other transmission media (for example, light pulses through fiber optic cables), or electrical signals transmitted through wires.

The computer-readable program instructions described herein may be downloaded from the non-transitory computer-readable storage medium to various computing/processing devices, or downloaded to an external computer or an external storage device via a network, such as the Internet, a local area network, a wide area network, and/or a wireless network. The network may include a copper transmission cable, an optical fiber transmission, a wireless transmission, a router, a firewall, a switch, a gateway computer, and/or an edge server. A network adapter card or a network interface in each computing/processing device may receive computer-readable program instructions from the network, and forward the computer-readable program instructions for storage in the non-transitory computer-readable storage medium in the each computing/processing device.

The computer program instructions used to perform the operations of the present disclosure may be assembly instructions, instruction set architecture (ISA) instructions, machine instructions, machine-related instructions, microcode, firmware instructions, state setting data, or source code or object code written in any combination of one or more programming languages. The programming languages include object-oriented programming languages such as Smalltalk, C++, etc., and conventional procedural programming languages such as "C" language or similar programming languages. The computer-readable program instructions may be executed entirely on a user's computer, executed partly on the user's computer, executed as a stand-alone software package, executed partly on the user's computer and partly on a remote computer, or entirely executed on the remote computer or a server. In a case of the remote computer, the remote computer may be connected to the user's computer through any kind of network, including a local area network (LAN) or a wide area network (WAN), or it may be connected to an external computer (for example, via the Internet through an Internet service provider). In some embodiments, an electronic circuit, such as a programmable logic circuit, a field programmable gate array (FPGA) or a programmable logic array (PLA), may be customized by using status information of the computer-readable program instructions. The computer-readable program instructions may be executed by the electronic circuit, so as to implement various aspects of the present disclosure.

Here, various aspects of the present disclosure are described with reference to flowcharts and/or block diagrams of the method, the apparatus (system) and the computer program product according to the embodiments of the present disclosure. It should be understood that each block of the flowcharts and/or block diagrams as well as a combination of blocks in the flowcharts and/or block diagrams may be implemented by the computer-readable program instructions.

These computer-readable program instructions may be provided to a processing unit of a general-purpose computer, a special-purpose computer or other programmable data processing device so as to produce a machine, so that an apparatus for implementing functions/actions specified in one or more blocks in the flowcharts and/or block diagrams is produced when these instructions executed by the processing unit of the computer or other programmable data processing apparatuses. It is also possible to store these computer-readable program instructions in a non-transitory computer-readable storage medium. These instructions allow the computer, the programmable data processing apparatus and/or other devices to operate in a specific manner. Accordingly, the non-transitory computer-readable medium having the instructions stored thereon may include a manufactured product that contains instructions for implementing various aspects of the functions/actions specified in one or more blocks in the flowcharts and/or block diagrams.

The computer-readable program instructions may also be loaded into the computer, the programmable data processing apparatus or other devices, so that a series of operation steps may be executed on the computer, the programmable data processing apparatus or other devices to produce a computer-implemented process. In this way, the instructions executed on the computer, the programmable data processing apparatus or other devices may achieve the functions/actions specified in one or more blocks in the flowcharts and/or block diagrams.

The flowcharts and block diagrams in the drawings illustrate possible architecture, functions and operations of the system, method and computer program product according to various embodiments of the present disclosure. In this regard, each block in the flowcharts or block diagrams may represent a part of a module, a program segment or instructions, which part contains one or more executable instructions for implementing a specified logical function. In some alternative implementations, the functions noted in the blocks may also occur in a different order from that noted in the drawings. For example, two blocks shown in succession may actually be executed substantially in parallel, or they may sometimes be executed in a reverse order, depending on the functions involved. It should also be noted that each block in the block diagrams or flowcharts as well as the combination of blocks in the block diagrams or flowcharts may be implemented by a dedicated hardware-based system that performs the specified functions or operations, or may be implemented by a combination of dedicated hardware and computer instructions.

The embodiments of the present disclosure have been described above. The above description is exemplary rather than exhaustive, and is not limited to the embodiments disclosed herein. Various modifications and changes are obvious to those ordinary skilled in the art without departing from the scope and spirit of the embodiments described herein. A selection of the terms used herein is intended to best explain the principles and practical applications of the embodiments or improvements to the technology in the market, or to enable other ordinary skilled in the art to understand the various embodiments disclosed herein.

What is claimed is:

1. A method of converting a schema in a deep learning framework, comprising:
    updating a first schema, based on first syntax elements in the first schema and a context relationship between the first syntax elements in the first schema, so as to obtain an updated first schema;
    generating second syntax elements corresponding to updated first syntax elements, the updated first schema comprising the updated first syntax elements;
    combining the second syntax elements according to a context relationship between the updated first syntax elements, so as to generate a second schema; and
    executing the second schema, wherein a machine overhead cost required for an execution of the first schema is greater than that required for an execution of the second schema, wherein
    generating the second syntax elements corresponding to the updated first syntax elements comprises inputting abstract syntax trees of the updated first syntax elements to converters corresponding to the updated first syntax elements, so that the converters convert and output abstract syntax trees corresponding to the abstract syntax trees of the updated first syntax elements as the second syntax elements.

2. The method of claim 1, wherein a number of the updated first syntax elements is less than that of the first syntax elements.

3. The method of claim 1, wherein the first syntax elements comprise a first operator, and the second syntax elements comprise a second operator, and wherein the method further comprises:
    allowing the second schema to be executed by the first operator corresponding to the second operator.

4. The method of claim 1, wherein a first identifier of the first schema is stored in a high-speed storage device, and wherein the method further comprises:
    acquiring the first identifier of the first schema;
    determining a second identifier of an another first schema; and
    determining the second schema as a schema corresponding to the further first schema in response to determining that the first identifier matches the second identifier.

5. The method of claim 1, wherein the first syntax elements comprise a loop operator and a conditional operator; and
    wherein the updating a first schema based on first syntax elements in the first schema and a context relationship between the first syntax elements in the first schema comprises:
    updating the conditional operator and the loop operator as an another loop operator, in response to determining that a context relationship between the conditional operator and the loop operator is to be adjacent in the first schema.

6. The method of claim 1, wherein the first syntax elements comprise constants, and wherein the updating a first schema based on first syntax elements in the first schema and a context relationship between the first syntax elements in the first schema comprises:
    removing repetitive constants in the first schema.

7. The method of claim 1, wherein the first schema is implemented by imperative programming, and the second schema is implemented by declarative programming.

8. An electronic device, comprising:
    one or more processors; and
    a storage device for storing one or more programs, wherein the one or more programs, when executed by the one or more processors, cause the one or more processors to implement operations of converting a schema in a deep learning framework, comprising:
    updating a first schema, based on first syntax elements in the first schema and a context relationship between the first syntax elements in the first schema, so as to obtain an updated first schema;
    generating second syntax elements corresponding to updated first syntax elements, the updated first schema comprising the updated first syntax elements;
    combining the second syntax elements according to a context relationship between the updated first syntax elements, so as to generate a second schema; and
    executing the second schema, wherein a machine overhead cost required for an execution of the first schema is greater than that required for an execution of the second schema, wherein
    generating the second syntax elements corresponding to the updated first syntax elements comprises inputting abstract syntax trees of the updated first syntax elements to converters corresponding to the updated first syntax elements, so that the converters convert and output abstract syntax trees corresponding to the abstract syntax trees of the updated first syntax elements as the second syntax elements.

9. A non-transitory computer-readable storage medium having computer programs stored thereon, wherein the computer programs, when executed by a processor, cause the processor to implement operations of converting a schema in a deep learning framework, comprising:
    updating a first schema, based on first syntax elements in the first schema and a context relationship between the first syntax elements in the first schema, so as to obtain an updated first schema;
    generating second syntax elements corresponding to updated first syntax elements, the updated first schema comprising the updated first syntax elements;
    combining the second syntax elements according to a context relationship between the updated first syntax elements, so as to generate a second schema; and
    executing the second schema, wherein a machine overhead cost required for an execution of the first schema is greater than that required for an execution of the second schema, wherein
    generating the second syntax elements corresponding to the updated first syntax elements comprises inputting abstract syntax trees of the updated first syntax elements to converters corresponding to the updated first syntax elements, so that the converters convert and output abstract syntax trees corresponding to the abstract syntax trees of the updated first syntax elements as the second syntax elements.

* * * * *